Figure 1:
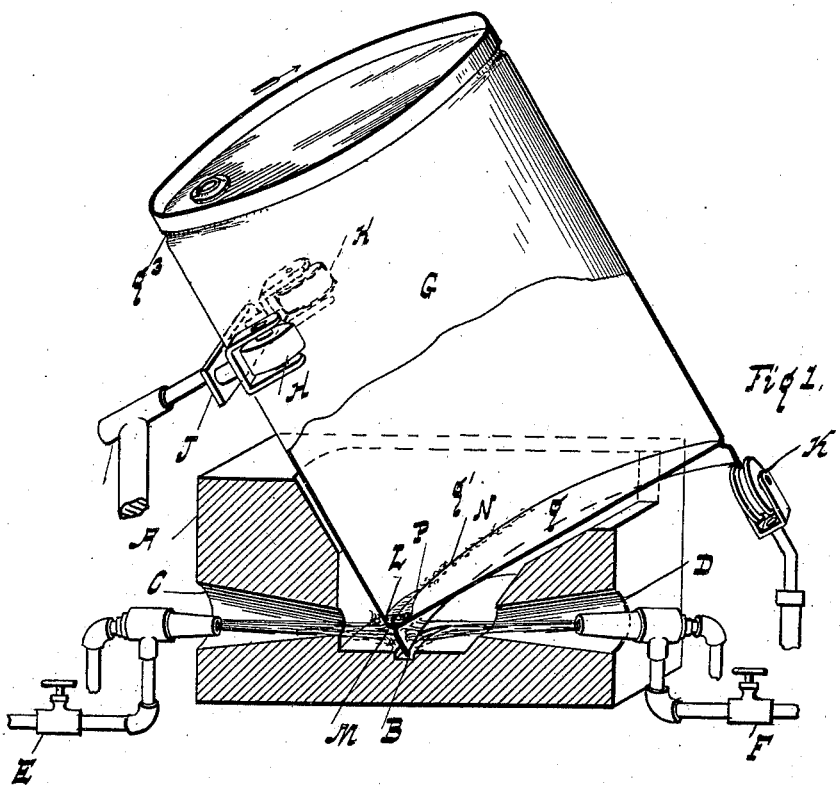

No. 685,975. Patented Nov. 5, 1901.
J. C. DANZIGER & A. A. COWLES.
PROCESS OF BRAZING SHEET METAL PACKAGES.
(Application filed Feb. 11, 1901.)
(No Model.) 2 Sheets—Sheet 1.

WITNESSES
T. S. Massey.
May E. Noth.

INVENTORS
Jacob C. Danziger
Arthur A. Cowles
By Parker & Burton
Attorneys.

No. 685,975. Patented Nov. 5, 1901.
J. C. DANZIGER & A. A. COWLES.
PROCESS OF BRAZING SHEET METAL PACKAGES.
(Application filed Feb. 11, 1901.)
(No Model.) 2 Sheets—Sheet 2.
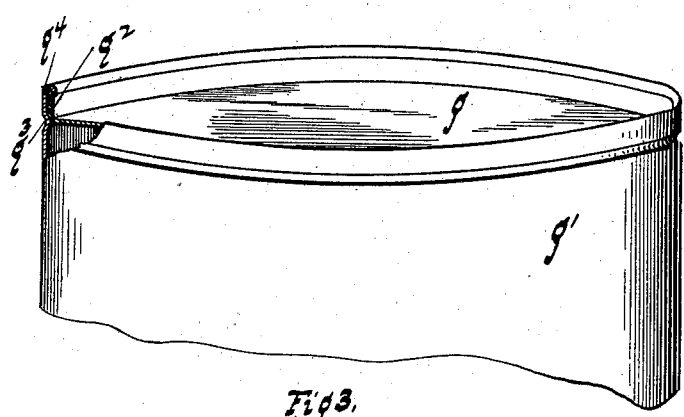
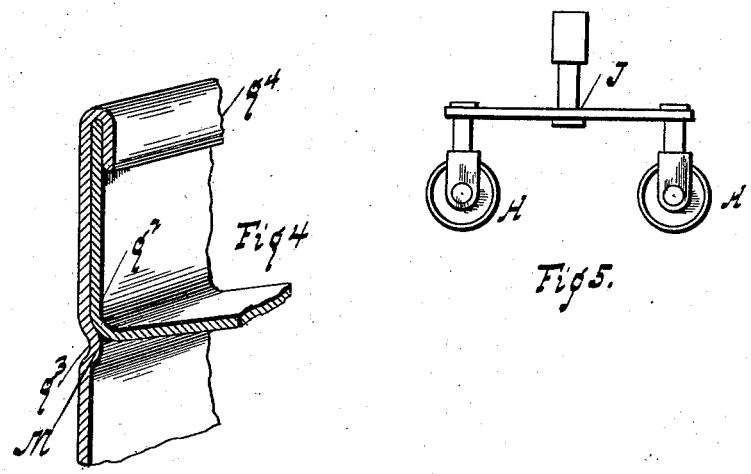

UNITED STATES PATENT OFFICE.

JACOB C. DANZIGER AND ARTHUR A. COWLES, OF DETROIT, MICHIGAN.

PROCESS OF BRAZING SHEET-METAL PACKAGES.

SPECIFICATION forming part of Letters Patent No. 685,975, dated November 5, 1901.

Application filed February 11, 1901. Serial No. 46,856. (No model.)

*To all whom it may concern:*

Be it known that we, JACOB C. DANZIGER and ARTHUR A. COWLES, citizens of the United States, residing at Detroit, county of Wayne, State of Michigan, have invented a certain new and useful Improvement in Processes of Brazing Sheet-Metal Packages; and we do declare the following to be a full, clear, and exact description of the invention, such as will enable others skilled in the art to which it pertains to make and use the same, reference being had to the accompanying drawings, which form a part of this specification.

Our invention relates to the method of manufacturing metal packages made of sheet iron or steel; and it consists in the process of manipulating and brazing the parts together, substantially as hereinafter specified and claimed. Heretofore packages of this character made of sheet steel or iron had their heads or ends attached to the body of the package by either riveting, like that shown in patent to Grant, No. 557,504, dated March 31, 1896, and afterward soldering by common solder, or by cleaning and tinning the surfaces, then riveting them and brazing by the ordinary process of brazing then known. In order to successfully braze a package of this character, the method of brazing must be adapted to meet certain conditions. It is well known that brazing cannot be ordinarily successfully performed unless the surfaces are cleaned and in perfect contact, and also that they be kept in contact during the process of brazing. It is also well known that brazing requires not only a high degree of heat to melt the brazing material, but that the plates to be brazed must also be raised to substantially the same or greater degrees of temperature. It is further well known that this cannot be done with plates or sheets of steel or iron, especially of any thickness, without raising a scale on the surfaces and also warping the plates to a greater or less degree, and that the warping during both heating and cooling will tend to prevent the retention of that close connection between the surfaces which is essential to brazing. Further, it is also well known that during the solidification of brazing material there is a point of critical temperature at which the material is extremely brittle and can be pulverized, and that therefore any strain brought upon the plates which are to be brazed tending to separate their surfaces after the brazing material has once permeated between them would tend to break and draw away those surfaces at this critical period of temperature, and thus destroy the integrity of the brazing. It is further well known that such packages as that hereinafter described, consisting usually of barrels or analogous structures, are very difficult to handle and at the same time meet all of the conditions necessary to securing the perfect joint requisite in order to make them liquid and gas tight. By the method hereinafter described we have met all these conditions and are enabled to successfully braze large packages of from fifty gallons' capacity upward with rapidity and success.

Figure 2:
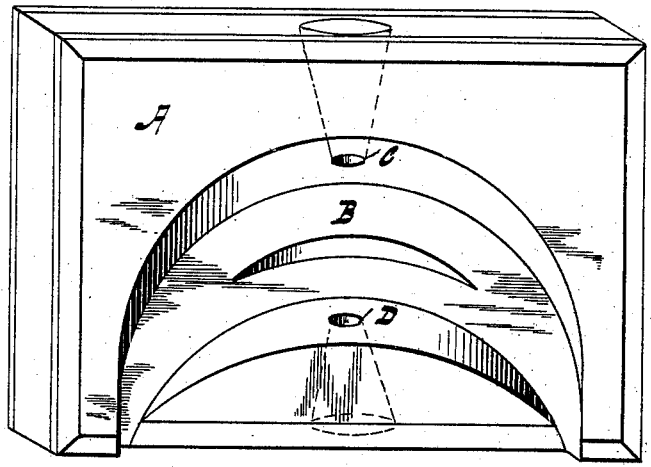

In the drawings, Figure 1 is a sectional elevation of the apparatus used and of a cylindrical package during the process of brazing in the head thereof. Fig. 2 is a plan view of the furnace employed. Fig. 3 shows the preferred method of assembling the parts to be brazed, portions being broken away. Fig. 4 is an enlarged sectional drawing of Fig. 3. Fig. 5 is a detail of the rollers, &c., shown in Fig. 1.

In the drawings, A represents the furnace which we employ, which consists, essentially, of a pit or depression shaped to admit of the reception of the article to be operated upon, as shown in Fig. 1, consisting, essentially, of a depression B. The material of which the walls of the depression is formed may be fire-clay or any substance which is adapted to resist a high temperature. Two twyers C D project from each of these depressions, respectively. These twyers are connected to a source of gas-supply, which may be controlled by valves E F, so that the amount of heat delivered by each can be modified to suit conditions.

The apparatus for furnishing gas and air are not novel and form no part of our invention, except that they must be so arranged that a high degree of temperature can be attained and that the respective temperatures of each may be controllable.

G is a package or barrel the chime of which is located in the curved depression of the furnace and practically directly between the twyers, $g$ being the head of the package and $g'$ being the cylindrical portion. As shown in the drawings, the head is united to the shell by being pressed into a cup form, as shown by the flanges at $g^2 g^2$, and adapted to be inserted into the end of the shell somewhat farther than the depth of the cup and until it meets the annular groove $g^3$, which groove is pressed into the shell. The cup-head is so formed as to form a close contact with the shell at all portions or substantially all portions of its outer surface. While in this position the lip of the shell at $g^4$ may be turned over to embrace the edge of the cup-formed head, or it might be held by riveting, if desired. The opposite end of the package, if not already brazed in, is open, or an opening is usually left therein for the insertion of a bung or valve, and in this condition, either with the open head or with the opening uppermost, it is placed so that the chime to be operated upon is, as already stated, within the depression of the furnace. While in this position the package is supported and held in condition to rotate by means of two traveling wheels H H, mounted upon a frame J, the chime opposite the portion located between the twyers being held also by a grooved roller K. It is obvious that while in this position and supported by these rollers J J and K the package can be rotated. When placed in position, the gas-jets are turned on and lighted and that portion of the flange or chime and a portion of the material of the shell and head adjacent thereto becomes highly heated. This heating causes both to expand, and if the circumferential shell was heated to higher temperature than the head adjacent thereto, which might very readily happen, its tendency would be to spring away from the head by swelling up therefrom. The temperature therefore of each jet must be so adjusted that if anything the head is made hotter than the shell which keeps the two surfaces in close contact. After being heated to some extent and before finally heating it to the desired temperature the requisite amount of fluxing material is fed in through the top or opening, which melts and penetrates between the surfaces and unites with the scale, forming a glass, which remains in the bottom of the depression on the interior of the package, as shown at L L. Brazing material is then also fed in in small quantities as granules or bits of iron and its specific gravity being heavier than that of the fluxing material falls into the angle between the head and shell at M and melts. Its specific gravity compels it to take the place of the fluxing material between the plates. It descends therefore and passes through and fills up all of the spaces which may exist between the plates, uniting the surfaces. As soon as it has acquired the requisite degree of temperature to melt the package is rotated just fast enough to permit the wave of heat created by the gas-jets to slowly advance around the periphery of the chime without any substantial cooling in the translation of the surfaces.

It is obvious that as the package is slowly rotated the fluxing material will precede the brazing material in consequence of its being higher and in connection with the curvature of the angle due to the position of the package. This is illustrated at N. It therefore penetrates between the shell and head, cleans the surfaces of the sheets in contact, and prepares them for the action of the brazing material which follows as the angle is slowly depressed during the revolution. As the brazing portion successively rises it is again subjected to the fluxing material, as shown at P, and gradually cools as it is moved slowly away from the influence of the gas-jets. By arranging the package in this manner and subjecting portions of it successively and slowly to the required temperature while feeding the fluxing material and brazing material in gradually in the manner specified enables the brazing to be done and the plates to gradually cool without any degree of warping which shall tear the surfaces apart at the critical temperature hereinbefore named. The area of the head and shell which is subjected to the heat is so localized that no general warping or creeping can take place, as has been found to be the case when attempts have been made to braze the whole head in any one operation by heating the head in the shell in its entirety. In such case the equal cooling was found impossible and unequal cooling was the result, with a consequence that when the temperature had receded to the critical point or brittleness of the brazing material the head and shell were torn apart and it was found impossible to make a tight package thereby.

We are aware that very thin sheets of metal tinned upon both sides, like common tin, have been soldered by an application of heat to their heads; but the operation of soldering does not require the heads to be heated to anything like the temperature that brazing does or, in fact, to be heated at all, and soldering will take place although the surfaces are not exactly contiguous to one another. The strain produced in soldering of this character is slight, if it practically exists at all; but in the case of packages of heavy sheet metal such as we have described when the high heating necessary to brazing is used the strains are so great that it has heretofore been found impractical, as already stated, to successfully braze them together.

By the means hereinbefore described we have been enabled to braze packages of sheet metal of an eighth of an inch or over in thickness. In fact, plates of almost any reasonable thickness, as boiler-plates, could be readily and successfully brazed in the manner specified, and the essential features of this process consist in the holding and moving of the package in such manner between two independent adjustable sources of heat that the requisite heat effect is produced upon comparatively small localized sections of the seam to be brazed, while at the same time it is subjected to the action of the fluxing material and the brazing material by a successive or progressive action.

What we desire to claim is—

1. As a method of brazing packages constructed of heavy sheet iron or steel; first, temporarily uniting the head portion and the body portion; second, arranging the package in such manner that the seam to be brazed, so formed of the head and the body, shall form a continually-progressive depression; third, subjecting the united head and body forming the seam each to a separate independently-controllable source of heat, and heating the same locally to a high degree of temperature; fourth, feeding in fluxing and brazing material and fifth, slowly moving the package in such manner that the seam is subjected progressively to the sources of heat and the brazing and fluxing material in the manner substantially as described.

2. The method of brazing an end into the cylindrical shell of a heavy sheet iron or steel package consisting in fixing the end within the cylindrical shell in the position it is intended to occupy, revolving said shell about its axis lying in an inclined position, applying a source of heat to a small area of said end at the periphery and at the lowest portion thereof, and simultaneously applying a source of heat to a small portion of the cylindrical shell adjacent to the heated portion of said end, and feeding fluxing and brazing material into said package at the heated portion thereof, substantially as described.

3. The method of brazing an end into the cylindrical shell of a heavy sheet iron or steel package, consisting in forming said end with an upright flange around its periphery, fixing said end with said flange outward, within the cylindrical shell, said flange lying against said shell, revolving said shell about its axis lying in an inclined position, applying a source of heat to a small area of said flange and end at the lower portion thereof, and simultaneously applying a source of heat to a small portion of the cylindrical shell adjacent to the heated portion of said end and feeding fluxing and brazing material into said package at the heated portion thereof, substantially as described.

4. The method of brazing an end into the cylindrical shell of a heavy sheet iron or steel package, consisting in forming said end with an upright flange around its periphery, placing said end with said flange outward within the cylindrical shell, said flange lying against said shell, turning the edge of said cylindrical shell over said flange so as to fix said end in place, revolving said shell about its axis lying in an inclined position, applying a source of heat to a small area of said flange and end at the lower portion thereof, applying a source of heat to a small portion of the cylindrical shell adjacent to the heated portion of said end and feeding fluxing and brazing material into said package at the heated portion thereof, substantially as described.

In testimony whereof we sign this specification in the presence of two witnesses.

JACOB C. DANZIGER.
ARTHUR A. COWLES.

Witnesses:
MAY LOCKE,
MAY E. KOTT.